J. D. BROWN & J. A. ROBERTS.
RECIPROCATING-CHURN.
No. 193,478. Patented July 24, 1877.
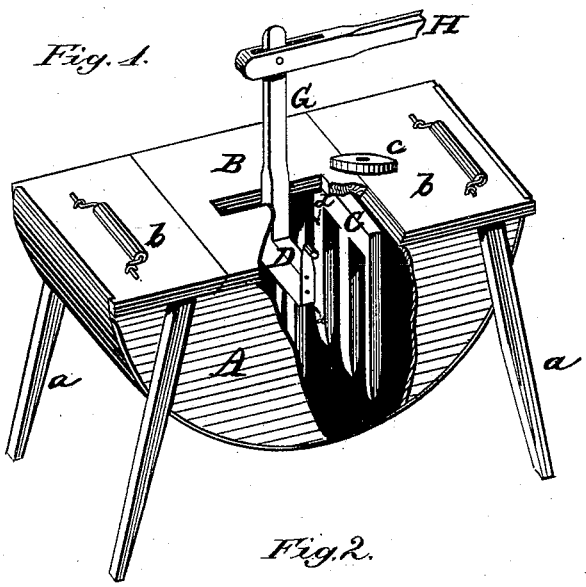
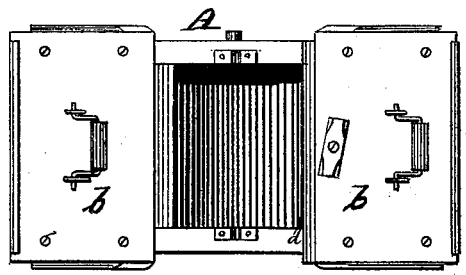
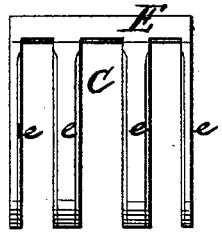
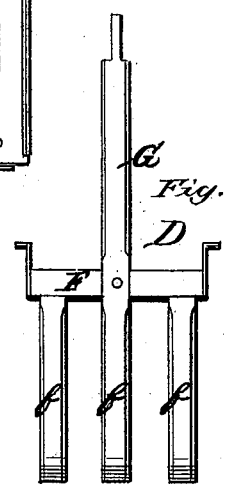
Attest:
Jno. P. Brooks.
August Petersohn
Inventor:
John D. Brown, and
James A. Roberts,
by C. A. Moers & Co.
attys.

UNITED STATES PATENT OFFICE.

JOHN D. BROWN AND JAMES A. ROBERTS, OF KEARNEY, MISSOURI.

IMPROVEMENT IN RECIPROCATING CHURNS.

Specification forming part of Letters Patent No. 193,478, dated July 24, 1877; application filed June 4, 1877.

*To all whom it may concern:*

Be it known that we, JOHN D. BROWN and JAMES A. ROBERTS, of Kearney, in the county of Clay, and State of Missouri, have invented certain new and useful Improvements in Churns; and we do hereby declare that the following is a full, clear, and exact description thereof, which will enable others skilled in the art to which it appertains to make and use the same, reference being had to the accompanying drawings, which form a part of this specification, and in which—

Figure 1 is a perspective view, with part broken away to show the construction; Fig. 2 is a top view, with cover removed. Fig. 3 is the dasher, and Fig. 4 is one of the racks detached.

Similar letters of reference indicate corresponding parts in all the figures.

This invention relates to that class of churns in which the dasher has a swinging reciprocating motion; and it consists in the construction and arrangement of parts, which we shall now proceed more fully to describe.

In the drawings, A is the body of the churn, which is semi-cylindrical in shape, and provided with legs $a\,a$, and, at the sides, with fixed covers $b\,b$. Between the fixed covers is a removable cover, B, held in place by a clasp, $c$. Upon the insides of the sides of the churn are studs $d\,d$, forming guideways, into which are slid the racks C C, (shown in detail in Fig. 4,) and which consist simply of wooden fingers $e$, secured to a cross-bar or body, E. On top of the side pieces of the churn are bearings for the dasher D, which consists of a cross-bar or body, F, having fingers $f$, like those of racks C, but so arranged as to slide between them when the dasher is operated. The dasher has a handle, G, projecting upward through a slot in cover B, and to the upper end of handle G is pivoted the operating lever or handle H.

From the foregoing description, and by reference to the drawings hereto annexed, the operation and advantages of our improved churn will be readily understood. By the rocking reciprocating motion of the dasher the cream is forced between the fingers of the racks and thoroughly beaten, thus causing the butter to come in a very short time, and with light labor, the construction of the churn being such as to render it easily operated. When the butter has come the cover B is lifted off, and the dasher and racks can then be easily slid out, thus enabling the butter to be conveniently gathered.

The buttermilk may be drained off through a perforation at the bottom of the churn, closed by a bung.

Having thus described our invention, we claim and desire to secure by Letters Patent of the United States—

The combination, with the churn-body A, of the dasher D and removable racks C C, all constructed and operating substantially in the manner and for the purpose set forth.

In testimony that we claim the foregoing as our own we have hereto affixed our signatures in presence of two witnesses.

JOHN D. BROWN.
JAMES A. ROBERTS.

Witnesses:
JAMES HUTCHISON,
WILLIAM B. LEACH.